United States Patent [19]

Ghose

[11] Patent Number: 4,602,305
[45] Date of Patent: Jul. 22, 1986

[54] MAGNETIC DISC MEMORY APPARATUS INCORPORATING TEMPERATURE COMPENSATION

[75] Inventor: Sanjoy Ghose, Santa Cruz, Calif.

[73] Assignee: Seagate Technology, Scotts Valley, Calif.

[21] Appl. No.: 496,837

[22] Filed: May 23, 1983

[51] Int. Cl.⁴ .............................................. G11B 5/016
[52] U.S. Cl. ...................................................... 360/97
[58] Field of Search ................. 360/75, 77, 78, 97–99, 360/105–109; 318/634

[56] References Cited

U.S. PATENT DOCUMENTS

| | | | |
|---|---|---|---|
| 3,720,930 | 3/1973 | Elsing | 360/97 |
| 3,900,782 | 8/1975 | Hammerschmitt | 318/634 |
| 4,348,624 | 9/1982 | Anderson et al. | 318/634 |

*Primary Examiner*—John H. Wolff
*Attorney, Agent, or Firm*—Flehr, Hohbach, Test, Albritton & Herbert

[57] ABSTRACT

According to the subject invention, the correction for thermal mistracking may be achieved by the incorporation of a compensating plate in the carriage, the plates' length and coefficient of expansion being selected to nullify the off-track shift with temperature.

Mistracking which varies from the outside to the inside track, i.e., there is a change in stroke length of the carriage with temperature, is compensated for by selecting a pulley material from a material having a coefficient of expansion directly related to the coefficient of expansion of the material of the disc. The result of a proper selection is that the change in size with ambient temperature of the disc is correlated with the change in size of the band with the same temperature, so that the total effect is as close to a nullity as possible.

19 Claims, 5 Drawing Figures

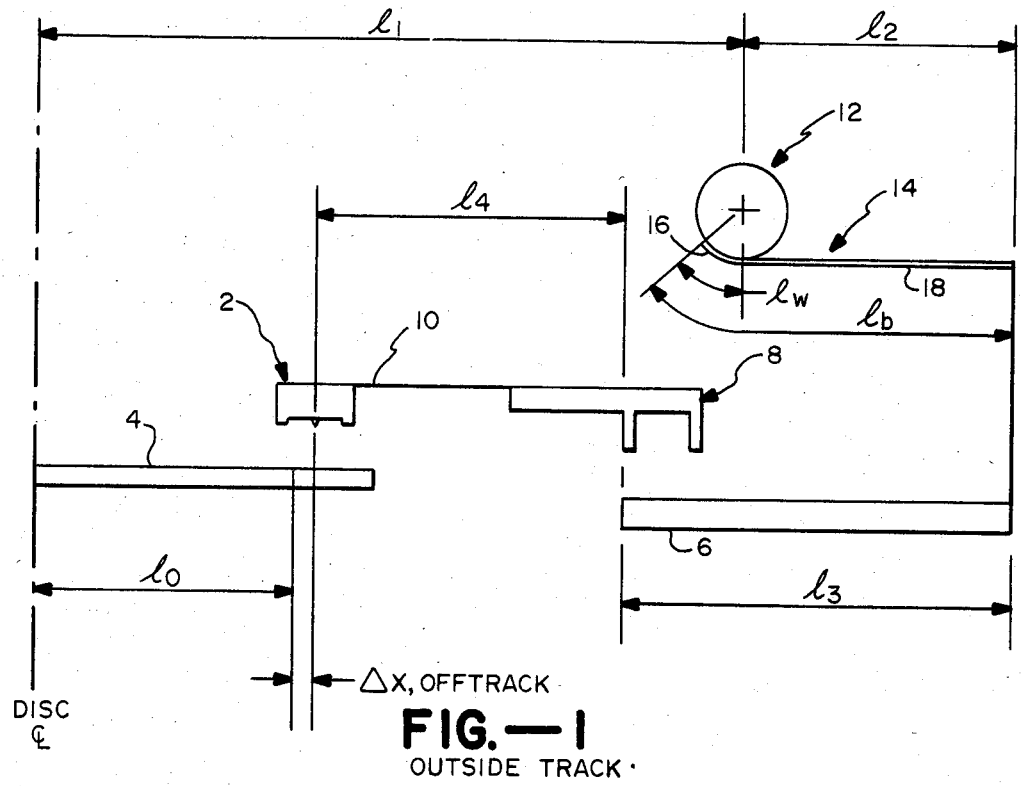
FIG.—1
OUTSIDE TRACK
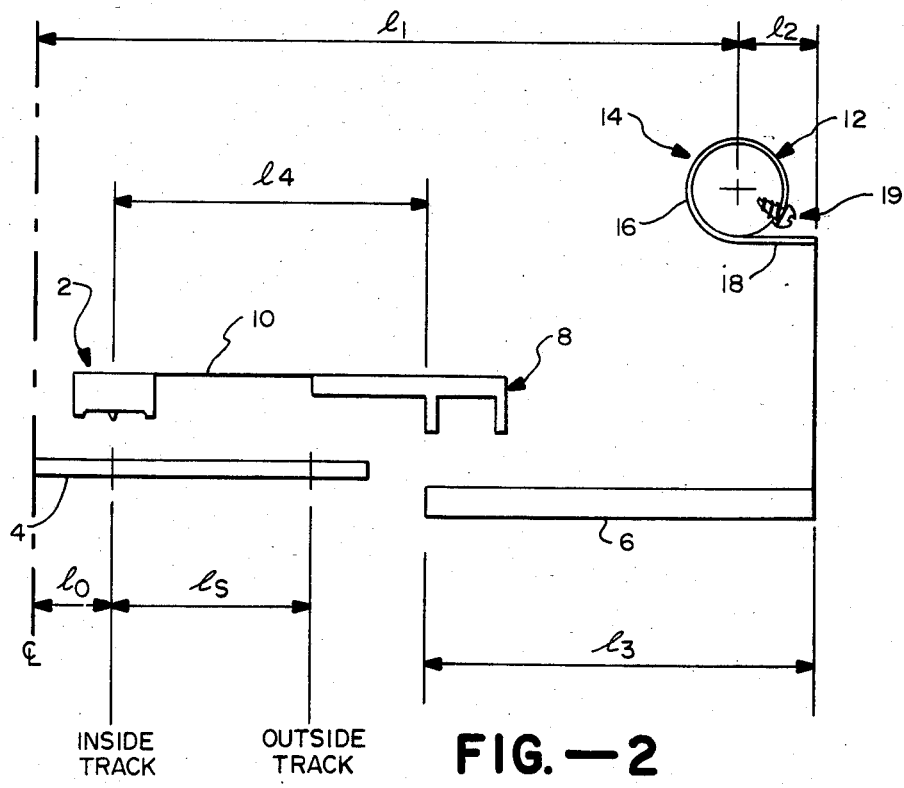
FIG.—2

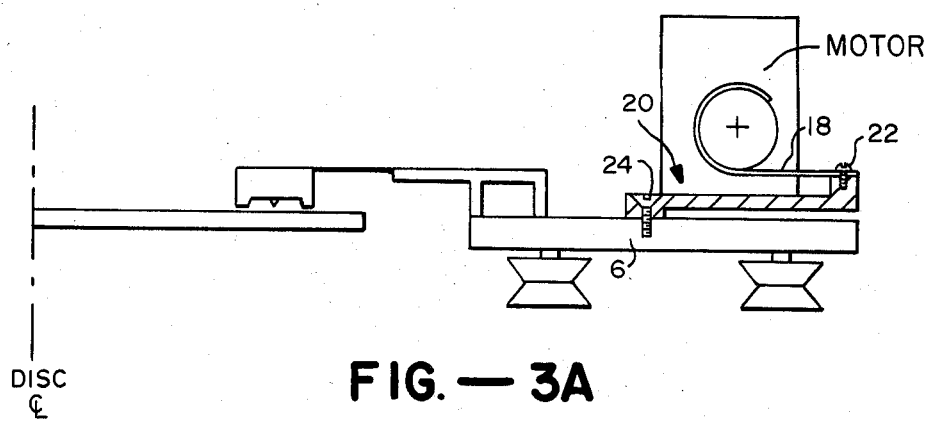
FIG. — 3A
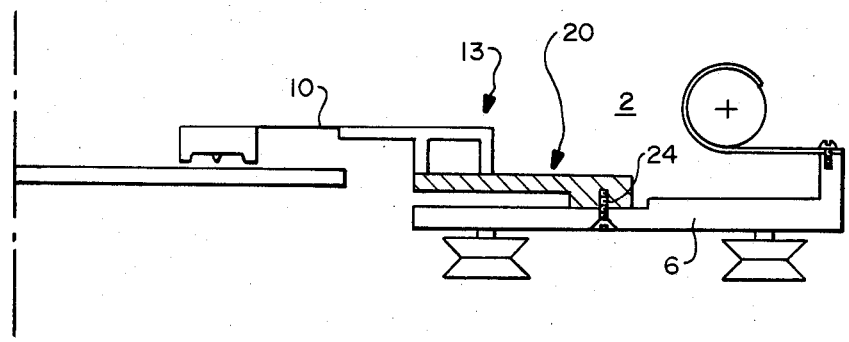
FIG. — 3B
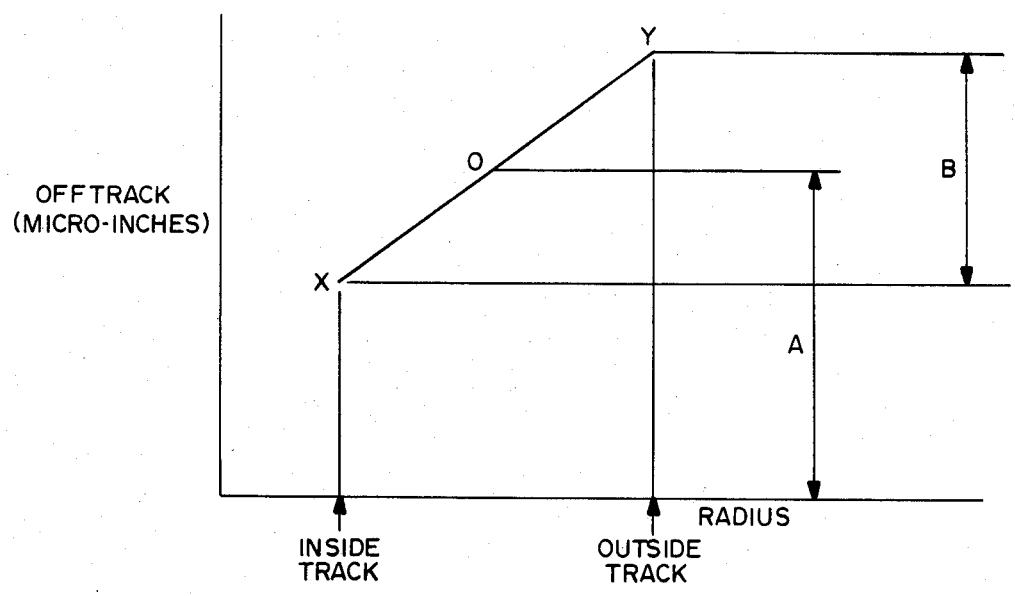
FIG. — 4

MAGNETIC DISC MEMORY APPARATUS INCORPORATING TEMPERATURE COMPENSATION

The present invention relates generally to magnetic disc memory apparatus and particularly to temperature compensation in the head positioning apparatus of a disc drive system by a calculated selection of materials for components, and particularly by the incorporation of a thermal compensation device in the head support and positioning structure.

A detailed disclosure of a disc drive machine and especially the carriage for carrying the heads in alignment with the recording tracks on the discs is disclosed in detail in application Ser. No. 139,428, filed Apr. 11, 1980 now U.S. Pat. No. 4,323,939 and incorporated herein by reference.

Disc drive machines record and reproduce information stored on concentric circular tracks recorded on magnetic discs. The tracks are written on and read by a magnetic head which cooperates with the surface of the disc. Various methods have been used to position the head including lead screws and band drives, driven by stepping motors. The combination of a stepping motor with a flexible disc media is, for example, disclosed in U.S. Pat. No. 4,071,866 which discloses a lead screw arrangement for coupling step rotation of the stepping motor to apparatus which supports the magnetic heads. Bank drives, with which this invention may be especially useful, are shown and described in U.S. Pat. Nos. 3,881,139, 4,161,004 and 4,170,146 among others. Such drives convert rotary motion of a stepper motor shaft to linear motion of the carriage which moves the heads mounted on the carriage radially across the disc to record and read adjacent, concentric circular tracks. The drive band is wrapped around the motor shaft or a pulley attached to the shaft and has its ends attached to the carriage whereby rotation of the shaft wraps one end of the band on the pulley and unwraps the other, causing the carriage to move linearly. A new track is recorded at each step of the stepper motor. The spacing of the tracks is dependent upon the amount of rotation that the motor shaft undergoes with each step and the diameter of the pulley upon which the band is wound.

Programming techniques and efficient use of memory space, demand that the tracks be spaced as closely adjacent to one another as possible.

However, the problem this creates is that heads must be very accurately positioned relative to the track so that the heads do not either read or store information on an incorrect track. A particular difficulty occurs in low cost rigid and floppy disc drives because in order to achieve a significant reduction in cost and complexity as demanded by the current competitive nature of the business, the magnetic head actuator which positions the head relative to the track does not incorporate any closed loop control. Therefore, it is highly desirable that there be minimal outside environmental effects upon the head positioning system as it is originally established. However, because of the wide range of environments in which a disc drive may be utilized, it has been found that a critical source of mistracking error in the positioning of the head relative to the desired track is due to thermal change in the various components with ambient temperature. As has been already noted, the thermal off-track problem is particularly severe in an open loop or quasi-closed loop drive as is common to the low cost rigid and floppy disc industry; there is no track-following servo to insure that the head is centered on the desired track, or to indicate that mistracking has occurred. Therefore, the mistracking problem which may be created by variations in ambient temperature does not become evident until data has been incorrectly read or written, and even at that time no inherent self-correction means exist.

Thermal off-track is also a significant problem in quasi-closed loop disc drives whereby adjustments are applied to the track position by infrequent sampled feedback from calibration tracks written outside the normal data band on the disc. These drives have limited off-track correction range and thermal off-track can produce motions greater than the correction ability of the positioner. That is, the effect of thermal shift is to greatly reduce the dynamic range over which corrections can be made.

The potential for effect of ambient temperature upon components in a disc system may be thought to be inherently minimal. In fact, changes in ambient temperature may alter the diameter or length of the components of the head carriage system to a degree that severe mistracking problems can occur, especially considering the accumulated effects over the total travel of the reading head from the innermost to the outermost track.

For example, a low-inertia aluminum pulley, a quarter inch in diameter, will show a difference of over 700 microinches in total travel track position between the innermost and outermost track for a 70° F. temperature difference. Although this may appear to be a small difference, it represents about 24% off-track for a 345 track-per-inch drive. This difference must be allowed for, as it affects the packing density, i.e., the number of tracks which can be recorded and read without error.

It is therefore an object of the present invention to provide and improve head positioning assembly which is temperature insensitive.

It is the further object of the invention to describe a scheme for selecting materials for each of the components of the head assembly, to provide a head and carriage assembly which is temperature insensitive, while utilizing materials which are commercially available and cost effective in the construction of the disc drive.

It is a further object of the invention to incorporate a compensating thermal element in the carriage head assembly to minimize or delete mistracking affects with changes in ambient temperature, while maintaining the simplicity of design of the carriage assembly and its cost effectiveness.

The above and other objects of the invention are achieved by a positioning apparatus including a head carriage, guide means for guiding said carriage, and linear drive means coupled to said carriage and a stepper motor carried by the housing including a pulley driven by the stepper motor having an end portion secured to the carriage, said carriage system comprising a carriage base and a metal flexure element connected between said carriage base and the head to be positioned relative to the disc, the material for construction of each of said carriage base, housing and pulley being normally of aluminum or being selected from one of two groups of components, the first group being a component which expands with changes in ambient temperature more than aluminum, the second group contracting with changes in ambient temperature relative to aluminum, whereby the changes in size with ambient temperature of each of said drive components, in sum, nullify each other.

It has further become apparent to the inventors of this invention that two possible types of mistracking with temperature may occur. The first type represents an increased thermal mistracking with increases in temperature, but the amount of mistracking is equal in amount and direction of shift from all tracks on the disc. According to the subject invention, the correction for this type of mistracking may be achieved by the incorporation of a compensating plate in the carriage, the plates' length and coefficient of expansion being selected to nullify the off-track shift with temperature.

The second type mistracking with temperature is the type that wherein the amount of mistracking varies from the outside to the inside track, i.e., there is a change in stroke length of the carriage with temperature, or a change in the effective radius of the disc from the center to the inside or outside track. This would especially be due to differences in expansion or contraction of the band which drives the carriage with temperature, relative to the disc itself. It is an object of this invention to compensate for the linear component of this changing mistracking with temperature by selecting a pulley material from a material having a coefficient of expansion directly related to the coefficient of expansion of the material of the disc. The result of a proper selection is that the change in size with ambient temperature of the disc is correlated with the change in size of the band with the same temperature, so that the total affect is as close to a nullity as possible.

FIG. 1 is a schematic view of the components in a disc drive assembly that are affected by ambient temperature.

FIG. 2 illustrates the relative positioning of the thermally affected elements of the carriage-head positioning system when the head is moved to a position of coincidence with the inside track of the disc drive.

FIGS. 3A and 3B illustrate two potential modifications of the carriage assembly shown in FIGS. 1 and 2 incorporating a thermal compensating plate to minimize mistracking affects.

FIG. 4 is an graph demonstrating the individual and cumulative thermal mistracking compensation achieved by this invention.

Referring first to FIG. 1, the figure is a schematic cross-sectional view of the key components of a typical disc drive system. The components shown schematically are those which in a typical disc drive are used to move or position the head 2 relative to the disc 4 for reading and writing on a disc in a disc drive. To the extent that these components are affected by ambient temperature, the result will be misalignment of the head 2 relative to a desired track on the disc 4.

The head 2 is moved into alignment with the chosen track on disc 4 by movement of carriage 6 which carries the head 2 via an "E" block 8 and flexure 10 which extends from the upper surface of block 8. The co-pending application incorporated by reference above, Ser. No. 139,428 describes the complete disc drive apparatus in greater detail. Referring further to FIGS. 1 and 2 (which show the same structural elements in crosssection), the head actuator comprises a stepper motor (not shown) having a drive shaft 12 which functions as a pulley to carry a drive band 14. The band 14 includes an inner portion 16 secured to the pulley 12 by a screw 19 and an outer portion 18 secured to the ends of carriage 6. Rotation of the pulley 12 clockwise or counterclockwise winds and unwinds the outer portion 18 of the band on the pulley 12 to move the carriage 6. Movement of the carriage 6 carries with it the block 8 and via the flexure 10 positions the head 2 over the desired track.

The problem to be solved with this invention becomes apparent from a study of FIGS. 1 and 2. The written track on the discs (at radius $L_0$) expands radially outward with increasing temperature in the housing cavity in which the disc 4 rotates, and radially inward with decreasing temperature. The casing (not shown) which carries the stepper motor (not shown) and hence the pulley 12 mounted on the motor at radius $L_1$ also expand radially outward, as does the unsupported length 18 of the band $L_2$. On the other hand, the length $L_3$ of carriage 6, and the significant unfixed length $L_4$ of the head mounting flexure 10 expand inward with respect to the disc 4 centerline CL. The last remaining component to be taken into consideration is the length $L_w$ of the central portion 16 of the band 14, whose direction of expansion and amount of expansion depend on the relative material properties of the pulley 12 and band 14. If the pulley 12 coefficient expansion is greater than that of the band 14, then the net motion is radially inward with increasing temperature over the length $L_w$, and vice versa.

The net effect due to temperature can be summarized as:

Thermal mistrack=(Movement of a track on the disc)−(Motion of the head).

If $\Delta X$ represents change in X due to temperature change $\Delta t$; or, (Thermal off-track)=Motion of [(disc 4)−(housing 12+band 14-carriage 6-flexure 10)], then $$\Delta X = \Delta L_0 - (\Delta L_1 + \Delta L_2 + \Delta L_w - \Delta L_3 - \Delta L_4).$$

That is, $$\Delta X = (\Delta L_0 + \Delta L_3 + \Delta L_4) - (\Delta L_1 + \Delta L_2 + \Delta L_w).$$

With this derivation in mind, the net effect of thermal mistracking can be established. For example, FIG. 1 shows (as indicated by $\Delta X$) the mistracking which occurs at the outside track due to thermally responsive expansion of the significant components. For the ideal case, it can be seen from the above equation that if all components were made from the same material, the net mistracking $\Delta X$ would be 0 since the sum of the change caused by the outward expanding components relative to the disc centerline is equal to the sum of the changes in the inwardly expanding components. A similar result is obtained at the inside track where if all the components were made of the same material, again the net mistracking would be expected to be 0.

In practice, however, the parts such as the pulley, band, carriage, flexure and disc are not all built from the same materials, because of limitations imposed by component availability cost, manufacturing processes, material stresses and other non-ideal considerations.

For example, the head arm flexure 10 which is of length $L_4$ and contributes significantly to any mistracking due to ambient temperature changes is typically made from a high strength stainless steel; many of the other parts, such as the casting and disc, are made of different alloys of aluminum. Thus, to minimize thermal mistracking, the inward expansion of the flexure 10 can be kept equal to the outward expansion of the band 14 by choosing them of the same material and having them be of the same length.

For reading the inside track using head 1, a similar result of minimizing mistracking can be obtained providing that the additional condition is met that the coefficient of expansion of the pulley 12 is equal to that of the disc 4. This is illustrated in FIG. 2, wherein it is apparent that the radius L0 of the inside track discussed with reference to FIG. 1 differs from the radius to the outside track by the length of the stroke $L_s$; and that, therefore, to move head 2 that distance $L_s$, the free length 18 of the band 14 is reduced by the length $L_s$ of the stroke, as the band winds on the pulley 12.

As discussed above, if the expansion of the band 14 due to its constituent material is equal to the expansion of flexure 10, then these two equal and opposite motions will always cancel even if the band be wrapped on the pulley 12. Then, to reduce thermal mistracking $\Delta X$, the decrease in outward expansion of the disc which has occurred at the inner track due to the smaller radius L0 from the center line of the disc to the inner track can be balanced by suitably choosing the material of the pulley 12 to provide an inward movement of the actuator by expansion of the pulley 12 in the same amount.

In the ideal case of a constant ambient temperature, the pulley 14 is chosen to have the same coefficient of expansion as the material of disc 4. Then, the limited expansion at the small radius of the inner track on disc 4 should equal the slight modification in inward motion of the read head 4 across the disc due to pulley 12 expansion and mistracking of the head 2 relative to the inner tracks on disc 4 will not occur.

Two types of mistracking are possible, the effects being illustrated in FIG. 4: (A) increasing thermal off-track with temperature, the direction and amount of shift caused by the thermal mistracking caused by thermal expansion being the same for all tracks on the disc 4. This is indicated by the offset from zero of the origin O of the sloped line in FIG. 4; and (B) in creased thermal mistracking $\Delta X$ with temperature, in an amount that varies between the outside track (FIG. 1) and the inside track (FIG. 2), indicated by the slope of the line from X to Y.

In general, both types of mistracking $\Delta X$ will be present in varying degrees in a given disc drive, depending on the relative thermal properties of the various components, the ambient air and air temperature distribution in the disc drive enclosure, and the inter-related variations in temperatures. Type A mistracking is due to a mismatch of outwardly and inwardly expanding components in the materials utilized. According to the invention, the problem may be solved but by incorporating a thermal compensating plate 20 in the actuator system 2.

An exemplary embodiment of the thermal compensating plate 20 is shown in FIGS. 3A and 3B. In FIG. 3A, the thermal compensating plate is installed by fixing it between the end of the unsupported portion of the band 18 by a screw or other fixture 22, and then to the carriage 6 by a second screw or fixture 24. An alternative embodiment shown in FIG. 3 would place the thermal compensating plate 20 substantially beneath the "E" block to which the flexure 10 is connected, the thermal compensating plate being again affixed to the carriage 6 by a screw or other fixture 24, and the "E" block 13 being affixed now to the upper surface of the thermal compensating plate in the same manner as it was previously affixed to carriage 6. Such a compensating plate 20 whenever the components of the total disc drive system are such that their effective coefficients of expansion are not fully offsetting, and so mistracking occurs at most tracks on the discs in about the same amount. The plate 20 would then be selected so that its length and coefficient of expansion nullify the observed off-track shift with temperature caused by the mismatch. Such a plate 20 would cancel the type "A" thermal shift which is the same for all the tracks, i.e., the average mistracking $\Delta X$ which is the same for inside and outside tracks. Referring to FIG. 4, the result would be to effectively shift the line XY down so that point 0 coincides with the horizontal axis, i.e., removing the constant off-track.

The plate material would typically be selected from either materials which cause inward shift which would preferably be steel or Invar, or from group of materials comprising preferably Magnesium or Zinc to cause outward shift, i.e., the plate is of a material having a greater or lesser coefficient of expansion than aluminum. The material and length of the plate are selected empirically; test results have have indicated that a plate of lower coefficient of expansion than aluminum usually is needed.

The mistracking $\Delta X$ of Type B discussed above varies with the length of the stroke $L_s$. That is, the inner track of a disc is affected more or less by thermal expansion of the disc than the outer track. This variable expansion is offset by appropriate selection of pulley material. If the inside track off-track is lower than that of the outside track, as shown in FIG. 4, then the pulley material 14 is selected to have a higher expansion coefficient than the disc whereby the stroke is lengthened as the expanding pulley causes the actuator to move inward. Typical pulley materials to lengthen the stroke achieved by the carriage actuator are Magnesium, Zinc and fiber composite materials. Conversely, where the inside off-track is larger than the outside, the stroke may be shortened by using pulley material such as steel and Invar. In both cases, the net result is to reduce the slope of the curve in FIG. 4, so that ideally it is horizontal, i.e., any mistrack is constant for all tracks across the disc. The result is that by then removing both the Type A & B mistrack; the ideal case of zero mistrack can be achieved.

These principles which have been discovered and outlined above relative to the offsetting variations in thermal expansion of the various essential components of the head actuator and disc provide a guide for selecting materials to attempt to zero the thermal mistracking $\Delta X$ in a disc drive. It is apparent that thermal mistracking $\Delta X$ can be eliminated by using a judicial choice of thermal responsive materials to be used for the pulley, and by the utilization of the thermal plate of an appropriate length and material. Other implementations of this invention may be achieved by those skilled in the art following the teachings of this specification. Therefore, the scope of this invention is intended to be limited only by the claims appended hereto.

What is claimed:

1. A disc drive system for reading data from a disc comprising a head for reading data tracks which are radially spaced from each other on said disc; means for radially moving said head relative to said disc comprising a flexure mounting said head, and a motor having a drive shaft, the output of said motor being coupled to said flexure through a drive band which winds and unwinds on said drive shaft; and means comprising a thermal compensation plate fixedly connected between said drive shaft and said flexure, said plate having a coefficient of thermal expansion selected to compensate for difference in thermal expansion of said radial head moving means relative to thermal expansion of said disc.

2. A disc drive system as claimed in claim 1 wherein said means for radially moving said head and said flexure comprise a carriage for mounting said flexure and said head;

said thermal compensation plate being fixedly inserted between said drive band and said flexure.

3. A disc drive system as claimed in claim 2 wherein said thermal compensating plate is connected between said carriage and the drive band which wraps and unwraps on the drive shaft of said motor.

4. A disc drive system as claimed in claim 3 wherein said thermal compensating plate is connected between said band and said carriage, said plate having a coefficient of thermal expansion along an axis parallel to said radial direction of movement to compensate for said thermal expansion of said head moving means relative to said tracks.

5. A disc drive system as claimed in claim 3 wherein said thermal expansion of said head moving means relative to the thermal expansion of said disc comprises a first linear portion which is substantially the same for all tracks on the disc and a second, nonlinear portion which varies between the inner and outer tracks of said disc, said motor having a pulley on the output end of said drive shaft for carrying said drive band, and said pulley having a coefficient of thermal expansion selected to offset the second nonlinear portion of thermal expansion in said disc drive.

6. A disc drive system as claimed in claim 2 wherein said thermal expansion of said head moving means relative to the thermal expansion of said disc comprises a first portion which is the same for all tracks on the disc and a second, nonlinear portion which varies between the inner and outer tracks of said disc, said motor having a pulley on the output end of said drive shaft for carrying said drive band, said thermal compensating plate is connected between said carriage and said head, said plate having a coefficient of thermal expansion along an axis parallel to said radial direction of movement to compensate for said first portion of said thermal expansion of said head moving means relative to said tracks.

7. A disc drive system as claimed in claim 1, said actuator means comprising a pulley on the end of the shaft, said band winding and unwinding on said pulley said thermal expansion of said head moving means relative to the thermal expansion of said disc comprises a first portion which is the same for all tracks on the disc and a second, nonlinear portion which varies between the inner and outer tracks of said disc, said motor having a pulley on the output end of said drive shaft for carrying said drive band, said pulley having a material selected to offset said first linear portion of said thermal expansion which occurs for said inner and outer tracks of said disc.

8. A system as claimed in claim 7, wherein said compensating element is of a material selected from a group of materials having a higher thermal coefficient of expansion than aluminum comprising steel and invar.

9. A method as claimed in claim 8 including the step of fixedly inserting said thermal compensation plate between said motor and said actuator means.

10. A method as claimed in claim 9 wherein said motor drives said carriage through a band connected to said carriage and winding about a pulley on said motor drive shaft; said method includes the step of selecting the material and size of said pulley to have a coefficient of thermal expansion to offset at least the nonlinear portion of thermal expansion between an inner and outer track of said disc.

11. A system as claimed in claim 7 wherein said compensating element is of a material selected from a group of materials having a lower thermal coefficient of expansion than aluminum comprising magnesium and zinc.

12. In a disc drive system for reading data from a disc enclosed within a housing.
   a radially movable head for reading data tracks on a disc, said tracks being spaced from each other on said disc;
   means for radially moving said head;
   said head moving means including motor means mounted on said housing and having a drive shaft, a carriage carrying the head on the end of a flexure, and a band winding and unwinding on the shaft to position the head and coupled to said head through a thermal compensating element mechanically coupled between the band and the flexure, for positioning said head;
   said disc, housing and actuator means comprising elements of a thermal circuit, each of said elements having an effective thermal coefficient of expansion determined by the material and size of said element, the material and length of said thermal compensation element being selected to thermally balance the differing expansion characteristics of the elements of said circuit whereby said head is maintained in alignment with the tracks on said disc.

13. In a disc drive system for reading data from a disc enclosed within a housing, a radially movable head for reading data tracks which are radially spaced from each other on said disc; a head moving means for radially moving said head including motor means fixedly mounted on said housing and and having a drive shaft, a carriage carrying the head on the end of the carriage and a flexure, and a band connected winding and unwinding on the shaft to position the head and coupled to said head; said disc, housing and moving means comprising elements of a thermal circuit, each of said elements having an effective thermal coefficient of expansion determined by the material and size of said element, said thermal expansion of said head moving means relative to the thermal expansion of said disc comprising a first portion which is the same for all tracks on the disc and a second, nonlinear portion which varies between the inner and outer tracks of said disc, said motor having a pulley on the output end of said drive shaft for carrying said drive band,
   a method of balancing said thermal circuit to reduce misalignment between said head and said tracks including the step of incorporating a compensation element mechanically coupled between the band and the flexure in said thermal circuit, and selecting the material and size of said compensation element to offset at least the first linear portion of said relative linear expansion.

14. A method as claimed in claim 13 including the step of selecting the material of the compensating element from a group fo materials having a higher thermal coefficient of expansion that aluminum comprising steel and invar.

15. A method as claimed in claim 12 wherein said means for radially moving said head comprises a flexure mounting said head and a carriage connected to the motor and mounting said flexure and head, said method comprising the step of inserting said thermal compensation plate between said motor and said carriage.

16. A method as claimed in claim 14 wherein said motor drives said carriage through a band wound about the motor drive shaft and connected to said carriage; said method including the step of connecting said thermal compensating plate between said band and said carriage, said plate having a coefficient of thermal expansion along an axis parallel to said radial direction of movement to compensate for said thermal expansion of said head moving means relative to said tracks.

17. A method as claimed in claim 12 wherein said means for radially moving said drive comprises a flexure mounting said head and a carriage connected to the motor and mounting said flexure and head, said method including the step of fixedly mounting said thermal compensating plate between said carriage and said head, said plate being selected to have a coefficient of thermal expansion along an axis parallel to said radial direction of movement to compensate for thermal expansion of said head moving means relative to said tracks.

18. A method as claimed in claim 17 including the steps of defining said band to have the same length and coefficient of expansion as said flexure.

19. A method as claimed in claim 13 including the step of selecting the material of the compensating element from a group of materials having a lower thermal coefficient of expansion that aluminum comprising magnesium and zinc.

* * * * *